(12) United States Patent
Mori (10) Patent No.: US 11,992,938 B2
(45) Date of Patent: May 28, 2024

(54) ROBOT ARM WITH MULTIPLE-CONNECTION INTERFACE

(71) Applicant: FANUC CORPORATION, Yamanashi (JP)

(72) Inventor: Masayoshi Mori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 384 days.

(21) Appl. No.: 16/384,932

(22) Filed: Apr. 16, 2019

(65) Prior Publication Data

US 2019/0375116 A1    Dec. 12, 2019

(30) Foreign Application Priority Data

Jun. 12, 2018    (JP) .................. 2018-111771

(51) Int. Cl.
*B25J 15/04*    (2006.01)
*B25J 17/02*    (2006.01)

(52) U.S. Cl.
CPC ....... *B25J 15/0408* (2013.01); *B25J 17/0266* (2013.01); *B25J 17/0283* (2013.01)

(58) Field of Classification Search
CPC .. B25J 15/0408; B25J 15/045; B25J 19/0033; B25J 17/0208; B25J 17/0233; B25J 15/0061; B25J 15/0066; B25J 15/04; B25J 15/0475
See application file for complete search history.

(56) References Cited

U.S. PATENT DOCUMENTS

| | | | | |
|---|---|---|---|---|
| 4,512,709 A * | 4/1985 | Hennekes | ............ | B23Q 1/0063 901/41 |
| 4,676,142 A * | 6/1987 | McCormick | ............. | B25J 15/04 279/4.06 |
| 5,428,713 A * | 6/1995 | Matsumaru | ............ | B25J 9/1615 700/245 |
| 8,453,533 B2 * | 6/2013 | Ryland | ....................... | B25J 9/06 74/490.05 |
| 2003/0208898 A1 | 11/2003 | Geary | | |
| 2006/0170384 A1 * | 8/2006 | Kumagai | ................. | B25J 17/00 318/568.11 |
| 2008/0315820 A1 | 12/2008 | Inoue et al. | | |
| 2009/0044655 A1 * | 2/2009 | DeLouis | ................ | B25J 15/045 74/490.05 |
| 2016/0193735 A1 * | 7/2016 | Krumbacher | ........ | B25J 19/0029 74/490.05 |
| 2017/0095881 A1 * | 4/2017 | Johnson | .................. | B25J 9/101 |
| 2017/0106543 A1 * | 4/2017 | Andoh | ....................... | F16H 1/32 |
| 2017/0266807 A1 | 9/2017 | Gombert et al. | | |

(Continued)

FOREIGN PATENT DOCUMENTS

| CN | 101327586 A | 12/2008 |
|---|---|---|
| CN | 202377951 U | 8/2012 |

(Continued)

*Primary Examiner* — Gregory Robert Weber
(74) *Attorney, Agent, or Firm* — HAUPTMAN HAM, LLP (57) ABSTRACT

There is provided a robot arm that includes a proximal unit and a distal unit configured to be connected to the proximal unit, the proximal unit having a multiple-connection interface connectable to a plurality of types of distal units different in shape. The connection interface is provided in an end face of the proximal unit with an annular connection interface disposed concentrically.

9 Claims, 9 Drawing Sheets

(56) References Cited

U.S. PATENT DOCUMENTS

| | | | |
|---|---|---|---|
| 2017/0282358 A1 | | 10/2017 | Inoue et al. |
| 2018/0111275 A1* | | 4/2018 | Kurek ..................... B25J 19/02 |
| 2019/0275668 A1* | | 9/2019 | Miyazaki ................ B25J 9/102 |
| 2019/0366553 A1* | | 12/2019 | Simkins ................ B25J 9/1697 |

FOREIGN PATENT DOCUMENTS

| | | | |
|---|---|---|---|
| CN | 202766650 U | | 3/2013 |
| CN | 105848834 A | | 8/2016 |
| CN | 205422933 U | | 8/2016 |
| CN | 205600727 U | * | 9/2016 |
| CN | 205600727 U | | 9/2016 |
| CN | 106313103 A | | 1/2017 |
| CN | 107263529 A | | 10/2017 |
| CN | 107901075 A | | 4/2018 |
| CN | 111216156 A | * | 6/2020 |
| JP | S60131179 A | | 7/1985 |
| JP | S61146486 A | | 7/1986 |
| JP | H224075 A | | 1/1990 |
| JP | H2212090 A | | 8/1990 |
| JP | H4226881 A | | 8/1992 |
| JP | H4-354687 A | | 12/1992 |
| JP | H9-290384 A | | 11/1997 |
| JP | 2010221355 A | | 10/2010 |
| JP | 2010221355 A | * | 10/2010 |
| JP | 2014-188616 A | | 10/2014 |
| JP | 2015504010 A | | 2/2015 |
| JP | 2017-100278 A | | 6/2017 |
| JP | 2017135961 A | | 8/2017 |

\* cited by examiner

ROBOT ARM WITH MULTIPLE-CONNECTION INTERFACE

RELATED APPLICATIONS

The present application claims priority of Japanese Application Number 2018-111771, filed Jun. 12, 2018, the disclosure of which is hereby incorporated by reference herein in its entirety.

BACKGROUND OF THE INVENTION

1. Field of the Invention

The present invention relates to a robot arm, and more particularly to a robot arm with a multiple-connection interface.

2. Description of the Related Art

When a variation of a robot is developed by changing specifications of a robot arm, such as arm length, transport capacity, and speed, only a unit such as a wrist unit, or a front arm unit may be changed based on common components. When an assembly interface of each of the units is different from a reference connection interface of the robot, an adapter for converting the assembly interface is created to perform assembly.

In this kind of robot arm, there is publicly known a technique related to a connection interface for connecting an end effector such as a hand, a welder, a screw driver, or the like to a leading end of the robot arm (e.g., refer to the document below).

JP 2017-100278 A discloses a tool changer configured to be mounted in a wrist of an industrial robot arm. The tool changer includes an annular body having a hole or a cavity, to be connected to a conduit or a hole in a flange of the wrist, and a device that fixes the annular body to a connector of a tool, to enable complete internal connection between the robot and the tool.

JP 2014-188616 A discloses a robot arm capable of attaching and detaching an end effector without separately using an attaching-detaching device for attaching and detaching an end effector. The robot arm is provided at its leading end with an engaging member that is moved between an engaging position for engaging an end effector and an engagement releasing position for releasing engagement, a moving member that moves the engaging member between the engaging position and the engagement releasing position, a coil spring that biases the engaging member in a direction from the engagement releasing position toward the engaging position, and the moving member moves the engaging member from the engaging position to the engagement releasing position to release the engagement.

JP 09-290384 A discloses an industrial robot configured such that a leading-end rotation part of an articulated arm is rotatably mounted with a holder that is mounted with a plurality of types of hands, and the holder is rotated to sequentially change a position of each hand to an operation position.

JP 04-354687 A discloses a hand attaching-detaching mechanism that is mounted at a leading end of a moving arm to selectively change and mount a plurality of hands. The hand attaching-detaching mechanism includes a positioning boss in a cylindrical shape with a tapered inner face, being formed integrally with a hand, a lock tube in a cylindrical shape, being formed to be able to be fitted into the positioning boss, a plurality of through-holes formed passing through the lock tube along a radial direction of the lock tube, a plurality of locking balls housed in the respective through-holes, being disposed to be able to project radially outward from an outer peripheral face of the lock tube, a mechanism that projects the locking balls radially outward to bring locking balls into contact with the tapered inner face to lock the hand to the leading end of the moving arm, and a locking sleeve that prevents each of the locking balls from falling off.

SUMMARY OF THE INVENTION

When a variation of a robot arm is developed, creating adapters individually for a plurality of types of units different in shape as described above results in an increase in the number of components and the cost of the adapters also increase.

In addition, various units, such as a wrist unit and a front arm unit, may be connected to another unit via a speed reducer. As the speed reducer, a commercial product is employed in many cases, so that various constraints were on an assembly interface regarding a speed reducer.

This requires a technique of developing a variation of a robot arm with a simple method.

An aspect of the present disclosure provides a robot arm that includes a proximal unit and a distal unit configured to be connected to the proximal unit, the proximal unit having a multiple-connection interface connectable to a plurality of types of distal units different in shape.

DETAILED DESCRIPTION

Embodiments of the present disclosure will be described in detail below with reference to the accompanying drawings. In the drawings, identical or similar constituent elements are given identical or similar reference signs. Additionally, the embodiments described below are not intended to limit the technical scope of the invention or the meaning of terms set forth in the claims.

Figure 1:
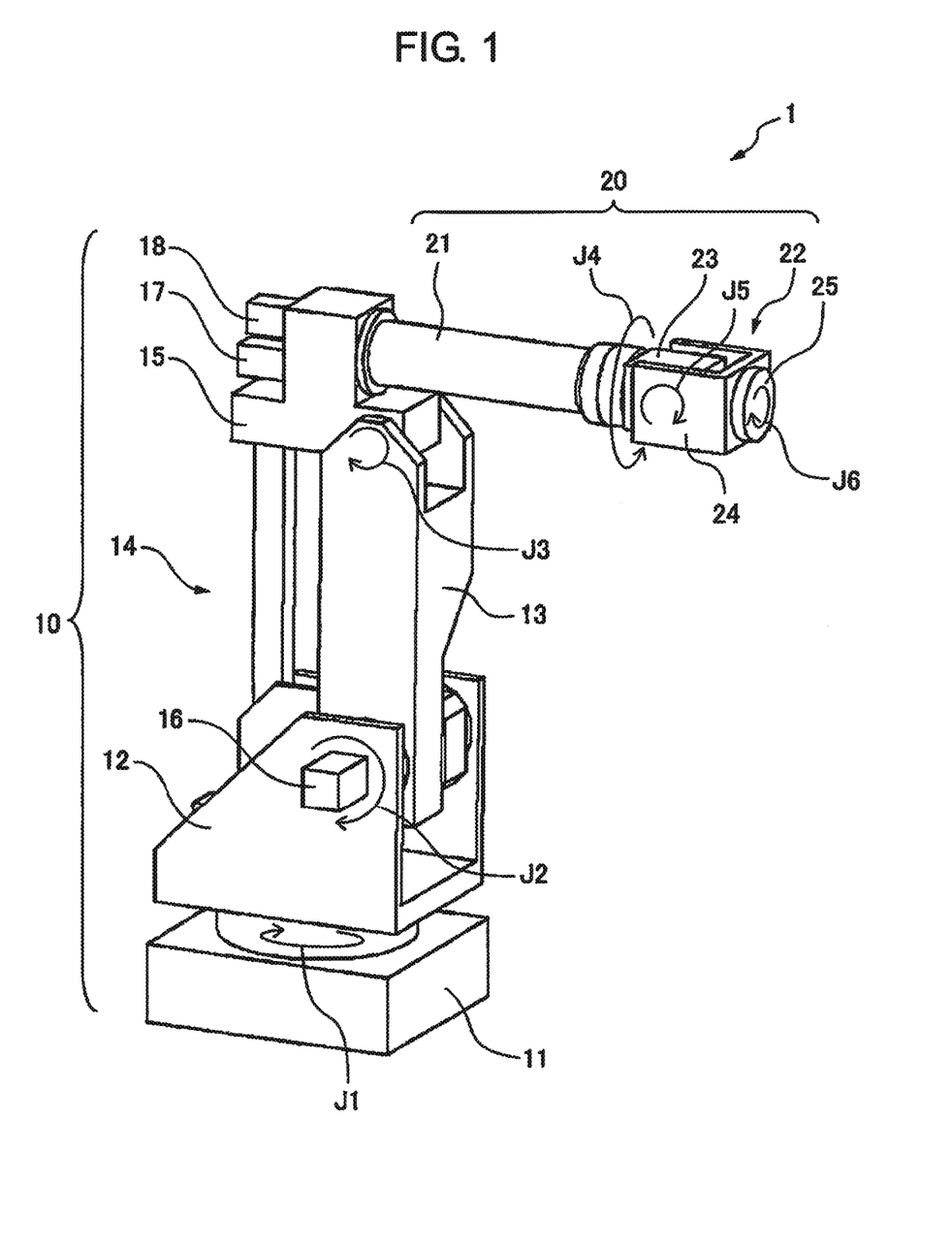
FIG. 1 is a perspective view illustrating a robot arm of a first embodiment.
Figure 2A:
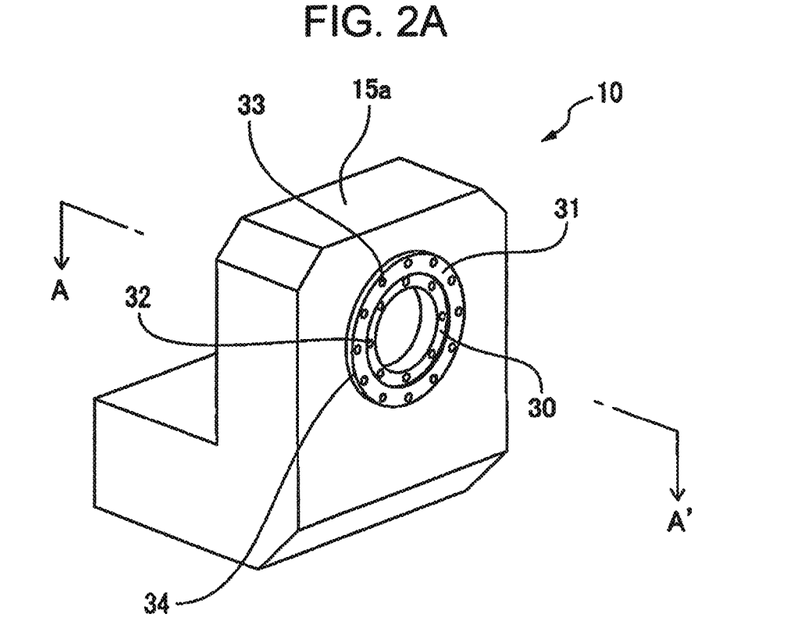
FIG. 2A is a front perspective view illustrating a part of a proximal unit of the first embodiment.
Figure 2B:
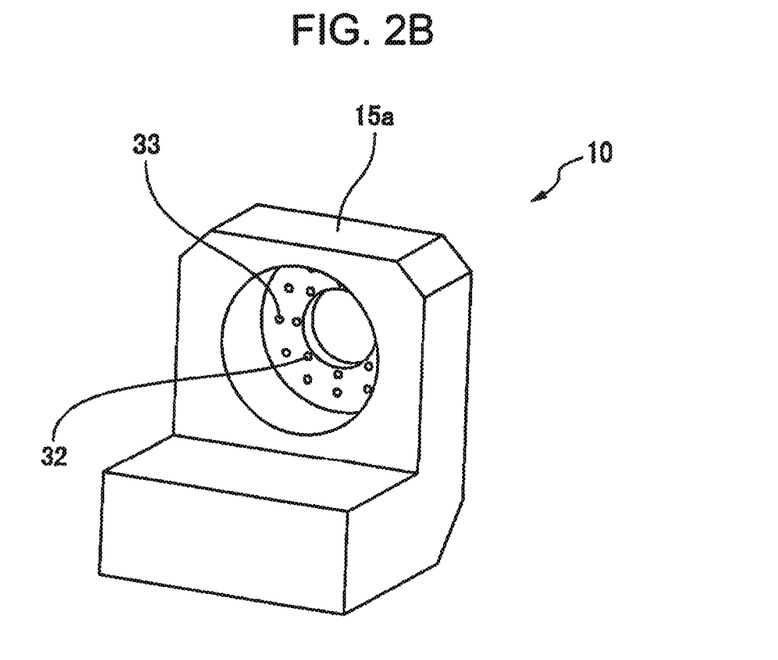
FIG. 2B is a rear perspective view illustrating a part of the proximal unit.
Figure 2C:
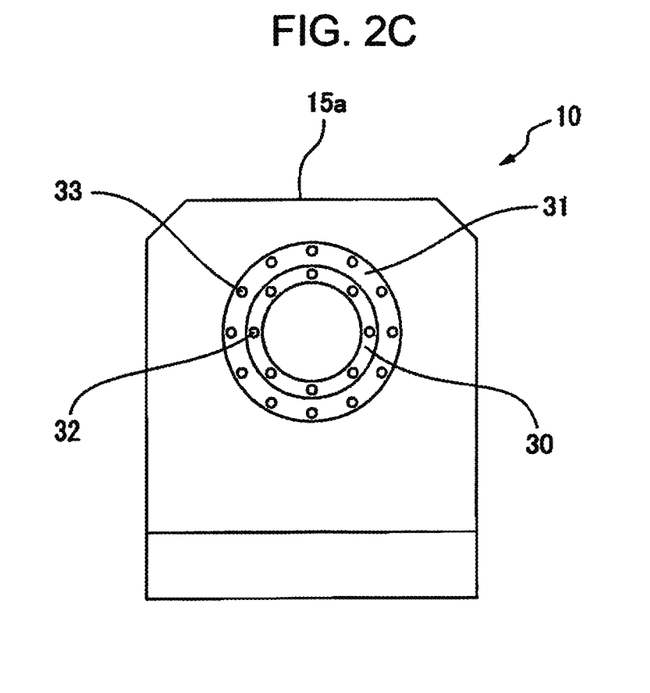
FIG. 2C is a front view illustrating a part of the proximal unit.
Figure 2D:
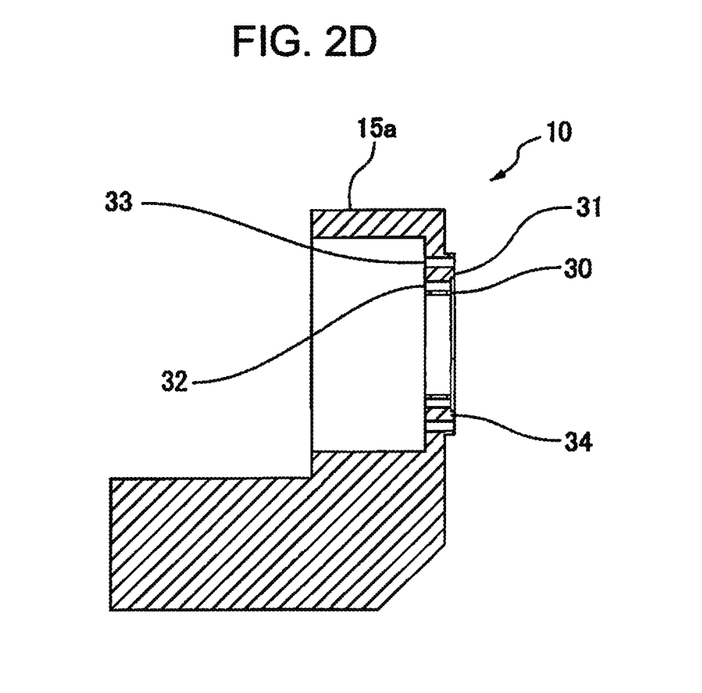
FIG. 2D is a longitudinal sectional view illustrating a part of the proximal unit taken along line A-A'.

FIG. 1 is a perspective view of a robot arm 1 of a first embodiment. The robot arm 1 is an industrial robot arm that is a six-axis vertical articulated robot arm, for example. The robot arm 1 typically includes a proximal unit 10 and a distal unit 20.

The proximal unit 10 includes a fixed base 11, a turning body 12, an upper arm 13, a parallel link mechanism 14, and a front arm casing 15. The turning body 12 is rotatably coupled to the fixed base 11, and horizontally turned about a first axis J1 by a drive source (not illustrated). The upper arm 13 is rotatably coupled to the turning body 12, and vertically turned about a second axis J2 by a drive source 16. The front arm casing 15 is rotatably coupled to the upper arm 13, and vertically turned about a third axis J3 by a drive source (not illustrated) that drives the parallel link mechanism 14.

The distal unit 20 includes a front arm 21 and a wrist unit 22. The wrist unit 22 is rotatably coupled to the front arm 21 and turned about a fourth axis J4 by a drive source 17. The wrist unit 22 includes a first wrist casing 23, a second wrist casing 24, and a flange 25. The second wrist casing 24 is rotatably coupled to the first wrist casing 23 and turned about a fifth axis J5 by a drive source (not illustrated). The flange 25 is rotatably coupled to the second wrist casing 24 and turned about a sixth axis J6 by a drive source 18.

To develop a variation in the robot arm 1 described above, the proximal unit 10 includes a multiple-connection interface connectable to a plurality of types of distal units different in shape. FIGS. 2A to 2D are respectively a front perspective view, a rear perspective view, a front view, and a longitudinal sectional view taken along line A-A', each illustrating a part of the proximal unit 10 of the first embodiment, i.e., a front arm casing 15a. The front arm casing 15a is different in shape from the front arm casing 15 illustrated in FIG. 1 but may be identical in shape thereto.

Connection interfaces 30, 31 are each provided in an end face of the front arm casing 15a, i.e., an end face of the proximal unit 10, with an annular connection interface disposed concentrically. While the proximal unit 10 includes the two connection interfaces 30, 31, the present invention is not limited to this. Besides this, the proximal unit 10 may include three or more connection interfaces. The connection interfaces 30, 31 are concentrically disposed, so that a plurality of types of distal units different in shape can be connected to the proximal unit 10 while its center axis is aligned with that of the proximal unit 10. In another embodiment, the connection interfaces 30, 31 each may include a connection interface in a rectangular shape.

The connection interfaces 30, 31 respectively include a plurality of inner peripheral fastening portions 32 and a plurality of outer peripheral fastening portions 33, being circumferentially disposed at equal intervals in the end face of the front arm casing 15a, i.e., the end face of the proximal unit 10. The inner peripheral fastening portions 32 and the outer peripheral fastening portions 33 are each formed of a slot, a tapped hole, or the like. When a fastening member such as a screw is inserted into each of the inner peripheral fastening portions 32 and the outer peripheral fastening portions 33, a plurality of types of distal units different in shape is fastened to the proximal unit 10. The inner peripheral fastening portions 32 and the outer peripheral fastening portions 33 are each circumferentially disposed at equal intervals. Thus, when a distal unit is fastened to the proximal unit 10, fastening force is equally distributed to prevent axial inclination of the distal unit with respect to the proximal unit 10.

The connection interfaces 30, 31 may further include a mating portion 34 to be fitted with a plurality of types of distal units different in shape. The mating portion 34 is an annular protrusion formed by causing the connection interface 31 of an outer ring to protrude from the connection interface 30 of an inner ring. Alternatively, the mating portion 34 may be an annular recessed portion formed by causing the connection interface 31 of the outer ring to be recessed from the connection interface 30 of the inner ring. The annular mating portion 34 described above enables not only a center axis of the distal unit to be easily aligned with that of the proximal unit 10, but also the center axis of the distal unit to be prevented from displacing. In another embodiment, the mating portion 34 may be a rectangular mating portion.

Figure 3A:
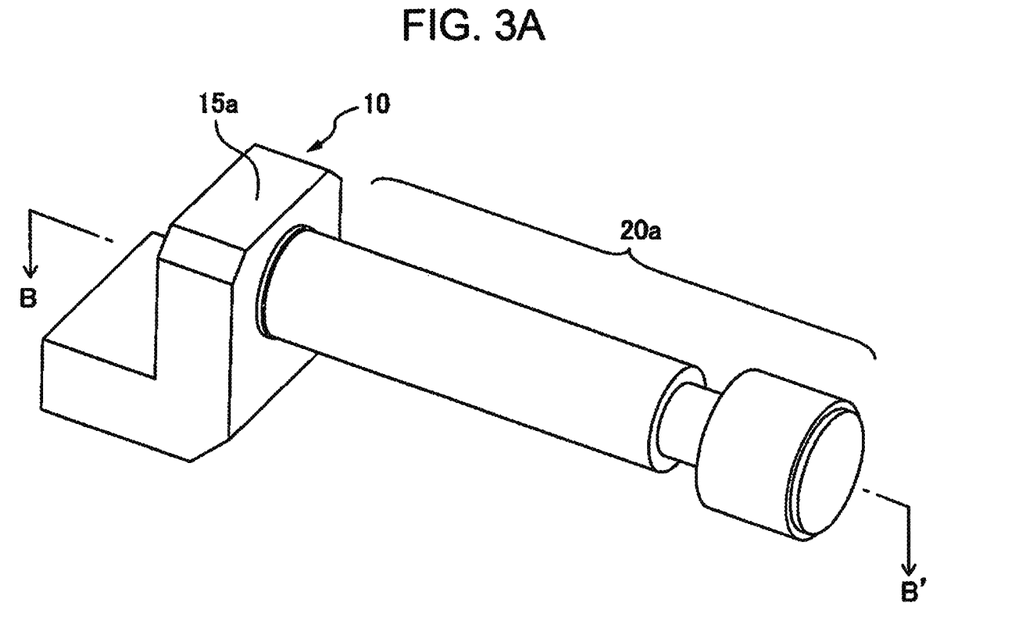
FIG. 3A is a perspective view illustrating an example in which a distal unit different in shape is connected to the proximal unit.
Figure 3B:
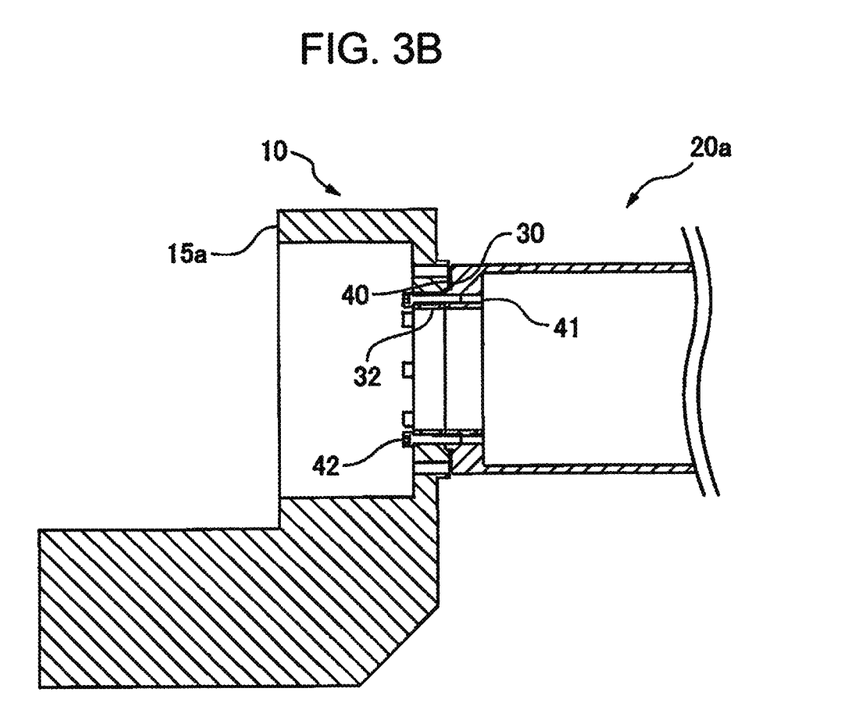
FIG. 3B is a sectional view illustrating the example in which the distal unit different in shape is connected to the proximal unit, taken along line B-B'.

FIGS. 3A and 3B are respectively a perspective view and a sectional view taken along line B-B', each illustrating an example in which a distal unit 20a different in shape is connected to the proximal unit 10. While the distal unit 20a has a shape different in shape from the distal unit 20 illustrated in FIG. 1, the distal unit 20a includes an assembly interface 40 identical to the assembly interface of the distal unit 20 illustrated in FIG. 1. The assembly interface 40 of the distal unit 20a is connected to the connection interface 30 of the inner ring of the proximal unit 10. The distal unit 20a includes fastening portions 41 aligning with the corresponding inner peripheral fastening portions 32 of the proximal unit 10. When a fastening member 42 such as a screw is inserted into each of the fastening portions 41 of the distal unit 20a and the inner peripheral fastening portions 32 of the proximal unit 10, the distal unit 20a is connected to the proximal unit 10.

Figure 4A:
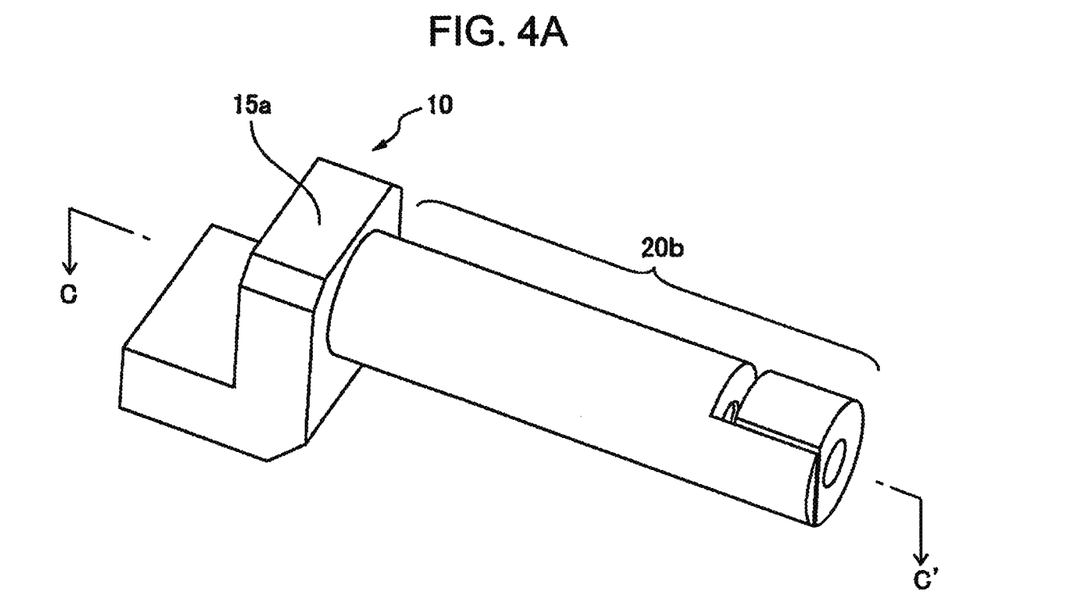
FIG. 4A is a perspective view illustrating an example in which a distal unit different in shape is connected to the proximal unit.
Figure 4B:
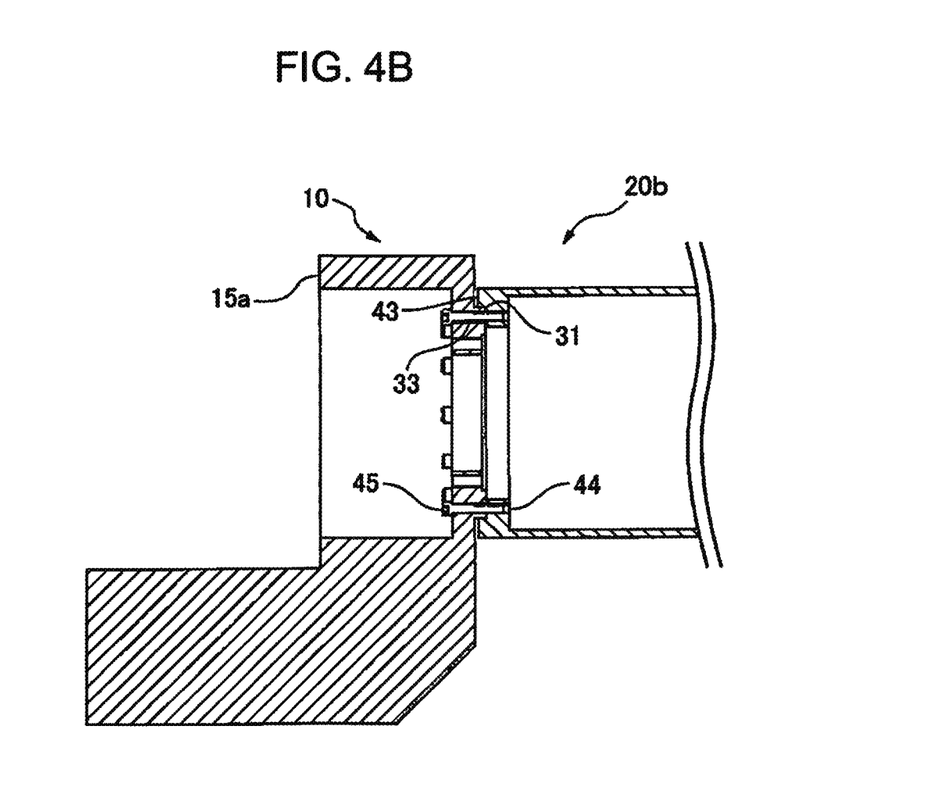
FIG. 4B is a sectional view illustrating the example in which the distal unit different in shape is connected to the proximal unit, taken along line C-C'.

FIGS. 4A and 4B are respectively a perspective view and a sectional view taken along line C-C', each illustrating an example in which a distal unit 20b different in shape is connected to the proximal unit 10. The distal unit 20b is different in shape from not only the distal unit 20 illustrated in FIG. 1, but also the distal unit 20a illustrated in FIG. 3A. In addition, the distal unit 20b includes an assembly interface 43 different from not only the assembly interface of the distal unit 20 illustrated in FIG. 1, but also the assembly interface 40 of the distal unit 20a illustrated in FIG. 3A. The assembly interface 43 of the distal unit 20b is connected to the connection interface 31 of the outer ring of the proximal unit 10. The distal unit 20b includes fastening portions 44 aligning with the corresponding outer peripheral fastening portions 33 of the proximal unit 10. When a fastening member 45 such as a screw is inserted into each of the fastening portions 44 of the distal unit 20b and the outer peripheral fastening portions 33 of the proximal unit 10, the distal unit 20b is connected to the proximal unit 10.

The robot arm 1 of the first embodiment enables the plurality of types of distal unit 20a, 20b different in shape to be connected to the proximal unit 10 via the multiple-connection interface 30, 31, so that a variation of the robot arm 1 can be developed with a simple method.

Figure 5:
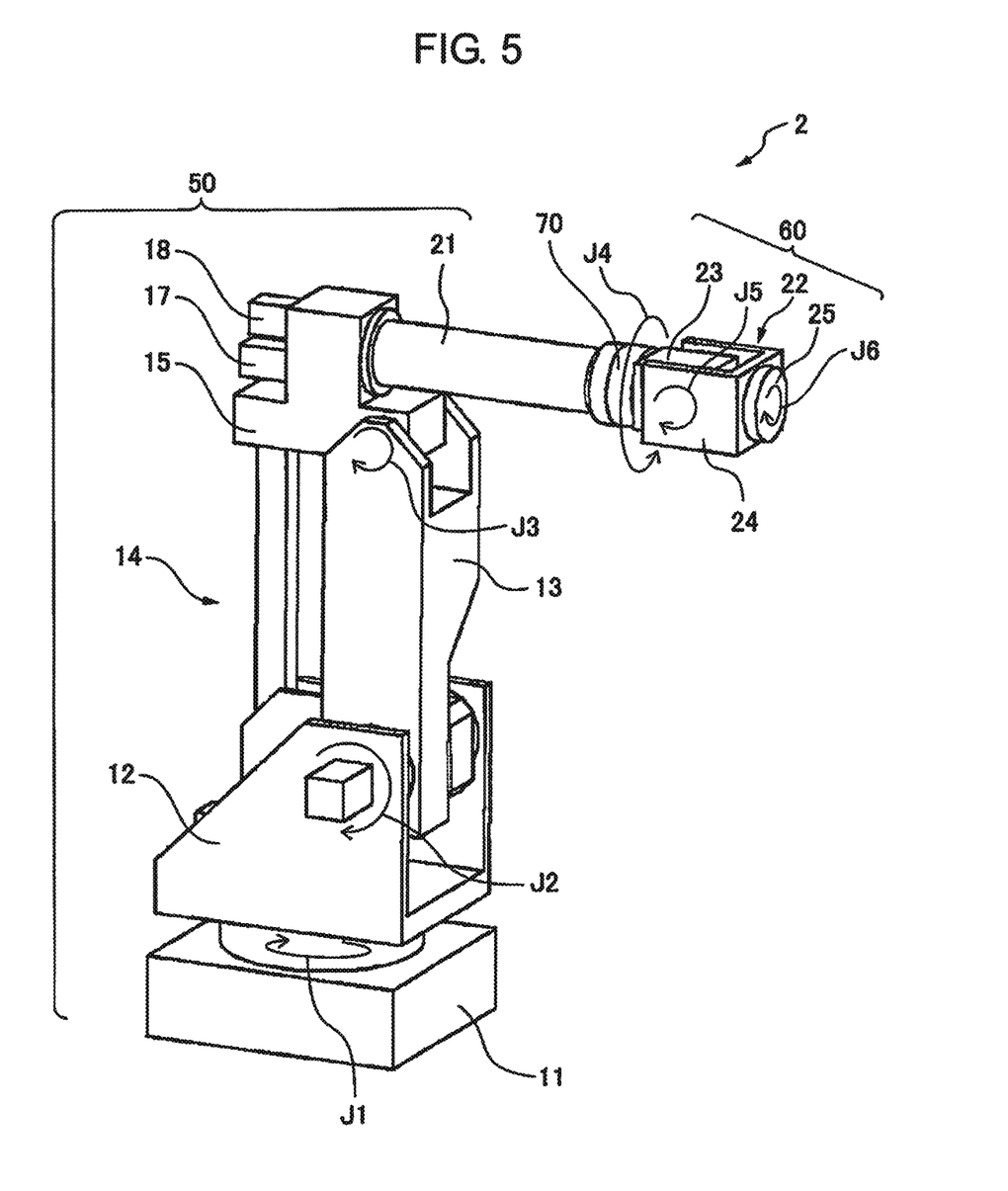
FIG. 5 is a perspective view illustrating a robot arm of a second embodiment.

FIG. 5 is a perspective view illustrating a robot arm 2 of a second embodiment. The robot arm 2 of the second embodiment has the same configuration as that of the robot arm 1 of the first embodiment but is different in components of the proximal unit and the distal unit. A proximal unit 50 includes not only the fixed base 11, the turning body 12, the upper arm 13, the parallel link mechanism 14, and the front arm casing 15, but also the front arm 21. A distal unit 60 does not include the front arm 21 and includes only the wrist unit 22. The distal unit 60 is connected to the proximal unit 50 via a speed reducer 70.

Figure 6:
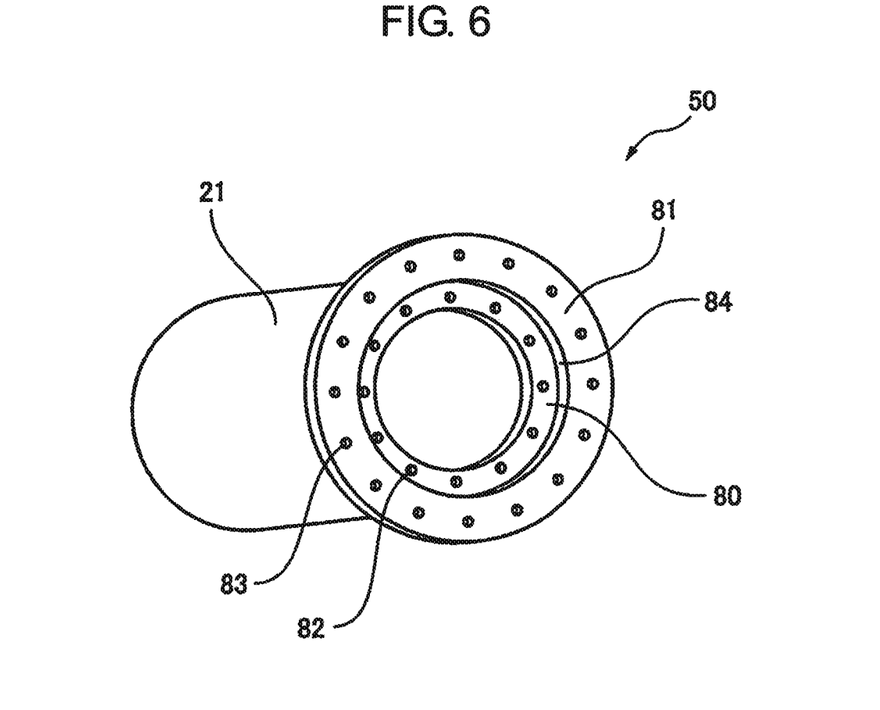
FIG. 6 is a front perspective view illustrating a part of a proximal unit of the second embodiment.

To develop a variation in the robot arm 2 described above, the proximal unit 50 includes a multiple-connection interface connectable to a plurality of types of speed reducers different in shape. FIG. 6 is a front perspective view illustrating a part of the proximal unit 50 of the second embodiment, i.e, the front arm 21. Connection interfaces 80, 81 are each provided in an end face of the front arm 21, i.e., an end face of the proximal unit 50, with an annular connection interface disposed concentrically. The connection interfaces 80, 81 are concentrically disposed, so that a plurality of types of speed reducers different in shape can be connected to the proximal unit 50 while its center axis is aligned with that of the proximal unit 50. In another embodiment, the connection interfaces 80, 81 each may include a connection interface in a rectangular shape.

The connection interfaces 80, 81 respectively include a plurality of inner peripheral fastening portions 82 and a plurality of outer peripheral fastening portions 83, being circumferentially disposed at equal intervals in the end face of the front arm 21, i.e., the end face of the proximal unit 50. The inner peripheral fastening portions 82 and the outer peripheral fastening portions 83 are each formed of a slot, a tapped hole, or the like. When a fastening member such as a screw is inserted into each of the inner peripheral fastening portions 82 and the outer peripheral fastening portions 83, a plurality of types of speed reducers different in shape is fastened to the proximal unit 50. The inner peripheral fastening portions 82 and the outer peripheral fastening portions 83 are each circumferentially disposed at equal intervals. Thus, when a speed reducer is fastened to the proximal unit 50, fastening force is equally distributed to prevent axial inclination of the speed reducer with respect to the proximal unit 50.

The connection interfaces 80, 81 may further include a mating portion 84 to be fitted with a plurality of types of speed reducers different in shape. The mating portion 84 is an annular protrusion formed by causing the connection interface 81 of an outer ring to protrude from the connection interface 80 of an inner ring. Alternatively, the mating portion 84 may be an annular recessed portion formed by causing the connection interface 81 of the outer ring to be recessed from the connection interface 80 of the inner ring. The annular mating portion 84 described above enables not only a center axis of the speed reducer to be easily aligned with that of the proximal unit 50, but also the center axis of the speed reducer to be prevented from displacing. In another embodiment, the mating portion 84 may be a rectangular mating portion. In another embodiment, an inner peripheral face of the connection interface 80 of the inner ring may be used as a mating portion.

Figure 7A:
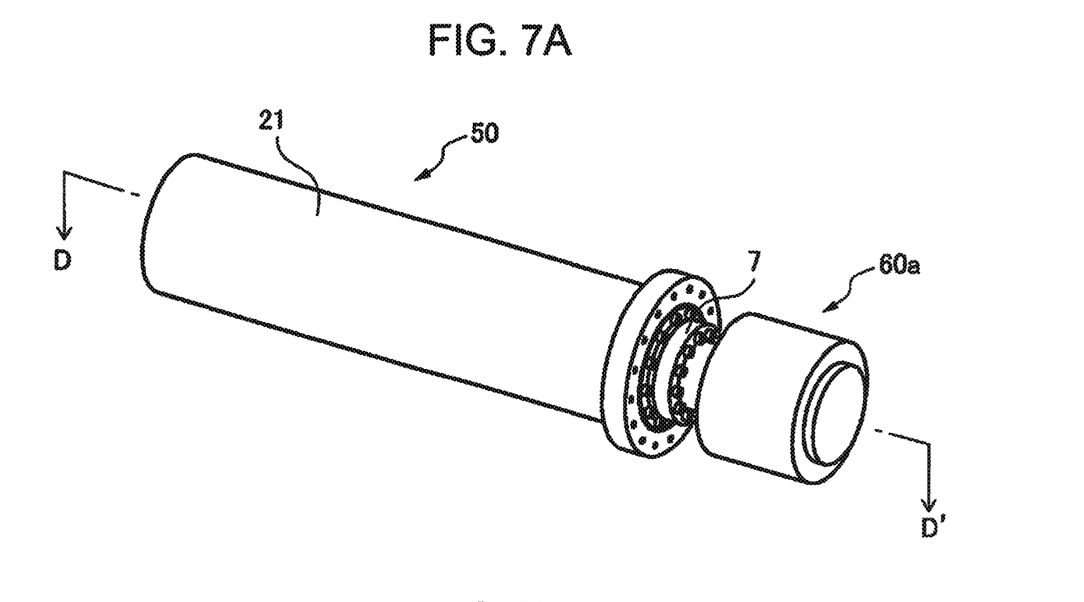
FIG. 7A is a perspective view illustrating an example in which a distal unit different in shape is connected to the proximal unit via a speed reducer different in shape.
Figure 7B:
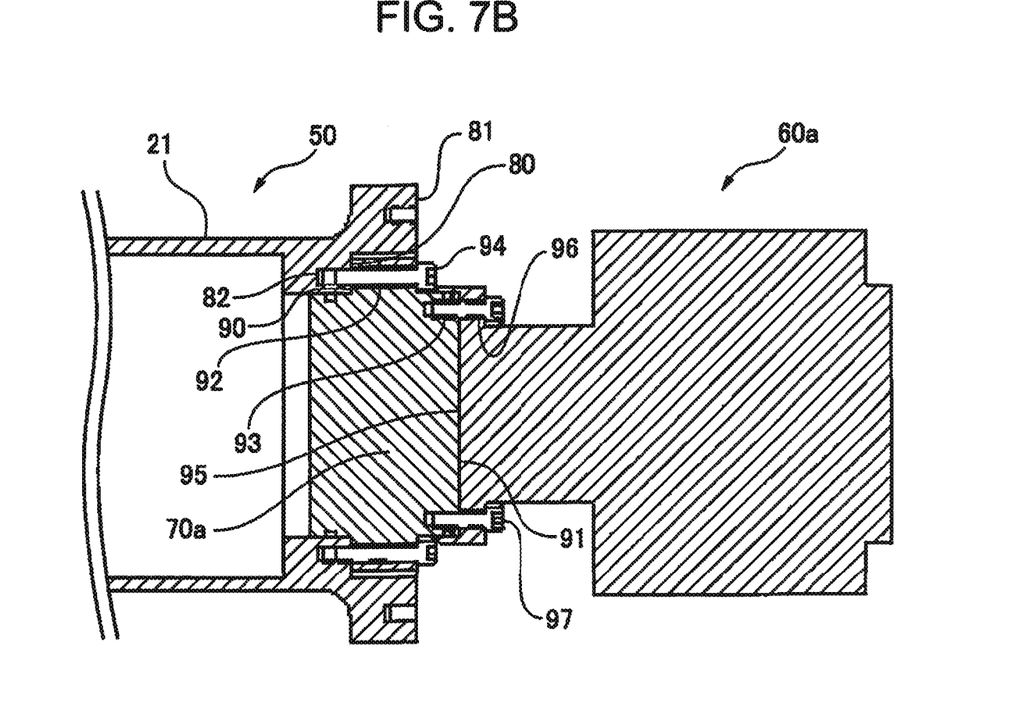
FIG. 7B is a sectional view illustrating the example in which the distal unit different in shape is connected to the proximal unit via the speed reducer different in shape, taken along line D-D'.

FIGS. 7A and 7B are respectively a perspective view and a sectional view taken along line D-D', each illustrating an example in which a distal unit 60a different in shape is connected to the proximal unit 50 via a speed reducer 70a different in shape. The speed reducer 70a and the distal unit 60a are respectively different in shape from the speed reducer 70 and the distal unit 60 illustrated in FIG. 5. In addition, the speed reducer 70a includes a proximal-side assembly interface 90 different from an assembly interface of the speed reducer 70 illustrated in FIG. 5. The proximal-side assembly interface 90 of the speed reducer 70a is connected to the connection interface 80 of the inner ring of the proximal unit 50. The speed reducer 70a includes proximal-side fastening portions 92 aligning with the corresponding inner peripheral fastening portions 82 of the proximal unit 50. When a fastening member 94 such as a screw is inserted into each of the proximal-side fastening portions 92 of the speed reducer 70a and the inner peripheral fastening portions 82 of the proximal unit 50, the speed reducer 70a is connected to the proximal unit 50.

In addition, the distal unit 60a includes an assembly interface 95 different from an assembly interface of the distal unit 60 illustrated in FIG. 5. The assembly interface 95 of the distal unit 60a is connected to a distal-side assembly interface 91 of the speed reducer 70a. The distal unit 60a includes fastening portions 96 aligning with a corresponding distal-side fastening portions 93 of the speed reducer 70a. When a fastening member 97 such as a screw is inserted into each of the fastening portions 96 of the distal unit 60a and the distal-side fastening portions 93 of the speed reducer 70a, the distal unit 60a is connected to the proximal unit 50 via the speed reducer 70a.

Figure 8A:
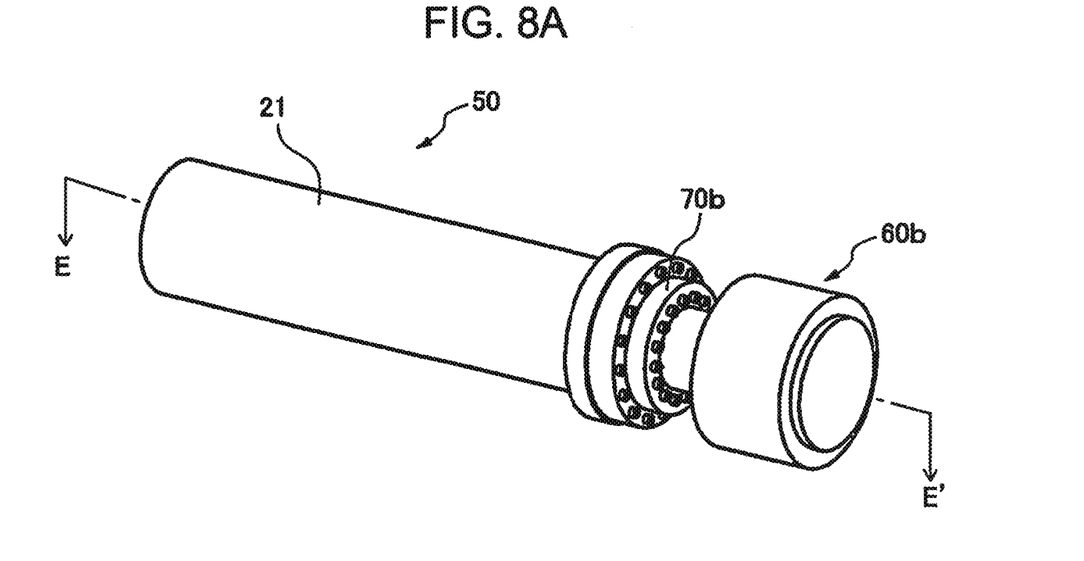
FIG. 8A is a perspective view illustrating an example in which a distal unit different in shape is connected to the proximal unit via a speed reducer different in shape.
Figure 8B:
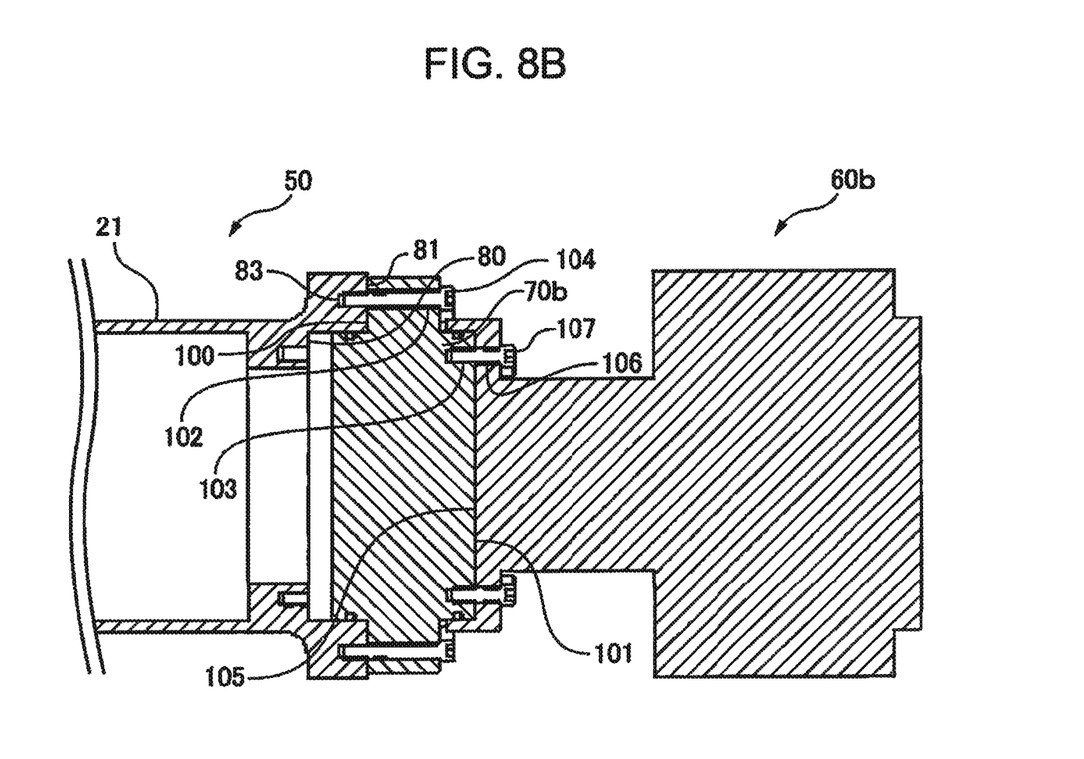
FIG. 8B is a sectional view illustrating the example in which the distal unit different in shape is connected to the proximal unit via the speed reducer different in shape, taken along line E-E'.

FIGS. 8A and 8B are respectively a perspective view and a sectional view taken along line E-E', each illustrating an example in which a distal unit 60b different in shape is connected to the proximal unit 50 via a speed reducer 70b different in shape. The speed reducer 70b and the distal unit 60b are respectively different in shape from not only the speed reducer 70 and the distal unit 60 illustrated in FIG. 5, but also the speed reducer 70a and the distal unit 60a illustrated in FIG. 7A. In addition, the speed reducer 70b includes a proximal-side assembly interface 100 different from not only the assembly interface of the speed reducer 70 illustrated in FIG. 5, but also an assembly interface of the speed reducer 70a illustrated in FIG. 7A. The proximal-side assembly interface 100 of the speed reducer 70b is connected to the connection interface 81 of the outer ring of the proximal unit 50. The speed reducer 70b includes proximal-side fastening portions 102 aligning with the corresponding outer peripheral fastening portions 83 of the proximal unit 50. When a fastening member 104 such as a screw is inserted into each of the proximal-side fastening portions 102 of the speed reducer 70b and the outer peripheral fastening portions 83 of the proximal unit 50, the speed reducer 70b is connected to the proximal unit 50.

In addition, the distal unit 60b includes an assembly interface 105 different from not only the assembly interface of the distal unit 60 illustrated in FIG. 5, but also an assembly interface of the distal unit 60a illustrated in FIG. 7A. The assembly interface 105 of the distal unit 60b is connected to a distal-side assembly interface 101 of the speed reducer 70b. The distal unit 60b includes fastening portions 106 aligning with a corresponding distal-side fastening portions 103 of the speed reducer 70b. When a fastening member 107 such as a screw is inserted into each of the fastening portions 106 of the distal unit 60b and the distal-side fastening portions 103 of the speed reducer 70b, the distal unit 60b is connected to the proximal unit 50 via the speed reducer 70b.

The robot arm 2 of the second embodiment enables not only the plurality of types of speed reducer 70a, 70b different in shape to be connected to the proximal unit 50 via the multiple-connection interface 80, 81, but also the plurality of types of distal unit 60a, 60b different in shape to be connected to the proximal unit 50 using the speed reducers 70, 70a, so that a variation of the robot arm 2 can be developed even when the speed reducers 70a, 70b, each of which is commercially available and has a constraint on an assembly interface, are employed.

Although some embodiments have been described in this specification, the present invention is not intended to be limited to the above-described embodiments, and it is to be understood that many changes can be made without departing from the scope of claims.

The invention claimed is:

1. A robot arm, comprising:
a proximal unit; and
a distal unit configured to be connected to the proximal unit,
the proximal unit including a connection interface connectable to a plurality of types of distal units different in shape, wherein
the connection interface is directly connectable to every one of a plurality of types of speed reducers each having a different shape from other types of speed reducers among the plurality of types of speed reducers at a portion which is directly connectable to the connection interface,
the distal unit is connected to the proximal unit via any one of the plurality types of speed reducers, and
the connection interface includes a mating portion fitted with the distal unit, and the mating portion is an annular protrusion protruding from the connection interface.

2. The robot arm of claim 1, wherein
the connection interface comprises annular connection interfaces disposed concentrically in an end face of the proximal unit.

3. The robot arm of claim 1, wherein
the connection interface comprises a plurality of fastening portions disposed circumferentially in an end face of the proximal unit.

4. The robot arm of claim 3, wherein
the fastening portions are each formed of a slot or a tapped hole.

5. The robot arm of claim 1, wherein
the distal unit includes a front arm.

6. The robot arm of claim 1, wherein
the distal unit includes a wrist unit.

7. A robot arm, comprising:
a proximal unit; and
a distal unit configured to be connected to the proximal unit,
the proximal unit including a connection interface connectable to a plurality of types of distal units different in shape, wherein
the connection interface is directly connectable to every one of a plurality of types of speed reducers different in shape,
the distal unit is connectable to the proximal unit via the speed reducer, the connection interface includes a first, inner interface and a second, outer interface disposed concentrically with the first, inner interface,
the first, inner interface comprises a plurality of first fastening portions disposed circumferentially at a first interval in an end face of the proximal unit,
the second, outer interface comprises a plurality of second fastening portions disposed circumferentially at a second interval in the end face of the proximal unit,
the first interval of the first fastening portions is different from the second interval of the second fastening portions,
the first, inner interface is directly connectable to a first type of speed reducer having a first shape, and the second, outer interface is directly connectable to a second type of speed reducer having a second shape, and
the connection interface further includes a mating portion fitted with the distal unit, and the mating portion is an annular protrusion formed by the second, outer interface protruding from the first, inner interface.

8. A robot arm, comprising:
a proximal unit including a plurality of first connection interfaces different from each other;
a plurality of distal units each having a second connection interface; and
a plurality of speed reducers each having a third connection interface, and a fourth connection interface opposite the third connection interface in an axial direction of said each speed reducer, wherein
the proximal unit is directly connectable to every one of the plurality of speed reducers,
the third connection interfaces of the plurality of speed reducers are different from each other,
the robot arm has a plurality of configurations different from each other,
in one configuration among the plurality of configurations,
one first connection interface among the plurality of first connection interfaces of the proximal unit is directly, detachably connected to the third connection interface of one speed reducer among the plurality of speed reducers, and
the fourth connection interface of the one speed reducer is directly, detachably connected to the second connection interface of one distal unit among the plurality of distal units, and
in a further configuration among the plurality of configurations,
a further first connection interface among the plurality of first connection interfaces of the proximal unit is directly, detachably connected to the third connection interface of a further speed reducer among the plurality of speed reducers,
the fourth connection interface of the further speed reducer is directly, detachably connected to the second connection interface of a further distal unit among the plurality of distal units, and
the proximal unit further includes a mating portion to be fitted with the plurality of speed reducers, and the mating portion is formed by an outer first connection interface among the plurality of first connection interfaces protruding from an inner first connection interface among the plurality of first connection interfaces.

9. The robot arm of claim 8, wherein the second connection interface of the one distal unit is different from the second connection interface of the further distal unit, and the fourth connection interface of the one speed reducer is different from the fourth connection interface of the further speed reducer.

\* \* \* \* \*